United States Patent
Mizuno et al.

(10) Patent No.: US 9,722,279 B2
(45) Date of Patent: Aug. 1, 2017

(54) ALL-SOLID-STATE METAL-METAL BATTERY COMPRISING ION CONDUCTING CERAMIC AS ELECTROLYTE

(71) Applicant: Toyota Motor Engineering & Manufacturing North America, Inc., Erlanger, KY (US)

(72) Inventors: Fuminori Mizuno, Ann Arbor, MI (US); Timothy S Arthur, Ann Arbor, MI (US); Ruigang Zhang, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 128 days.

(21) Appl. No.: 14/582,699

(22) Filed: Dec. 24, 2014

(65) Prior Publication Data

US 2016/0190636 A1    Jun. 30, 2016

(51) Int. Cl.
*H01M 10/0562* (2010.01)
*H01M 10/0525* (2010.01)
*H01M 4/38* (2006.01)

(52) U.S. Cl.
CPC ......... *H01M 10/0562* (2013.01); *H01M 4/38* (2013.01); *H01M 4/381* (2013.01);
(Continued)

(58) Field of Classification Search
CPC .. H01M 10/052; H01M 10/0525; H01M 4/38; H01M 4/381; H01M 4/382; H01M 2220/20
See application file for complete search history.

(56) References Cited

U.S. PATENT DOCUMENTS

| | | |
|---|---|---|
| 3,736,186 A | 5/1973 | Liang |
| 4,390,446 A | 6/1983 | Barnette et al. |
| | (Continued) | |

FOREIGN PATENT DOCUMENTS

| | | | |
|---|---|---|---|
| DE | 2221 042 | | 4/1972 |
| GB | 1382339 | * | 1/1975 |

OTHER PUBLICATIONS

Tobias Placke, et al., "Reversible Intercalation of Bis(trifluoromethanesulfonyl) imide Anions from an Ionic Liquid Electrolyte into Graphite for High Performance Dual-Ion Cells", Journal of The Electrochemical Society, 159 (11) pp. A1755-A1765 (2012).

(Continued)

*Primary Examiner* — Ula C Ruddock
*Assistant Examiner* — Thomas Parsons
(74) *Attorney, Agent, or Firm* — Oblon, McClelland, Maier & Neustadt, L.L.P.

(57) ABSTRACT

An all-solid-state metal-metal battery with both high energy density and high power density is provided. The battery has an anolyte including at least one active anode metal ion conducting ceramic solid and a catholyte including at least one active cathode metal ion conducting ceramic solid sandwiched between an anode including an alkali metal or an alkaline earth metal as the active anode metal and an cathode including a transition metal as the active cathode metal. Prior to the initial charge, the battery may have an anode current collector devoid of the active anode metal or a cathode current collector devoid of the active cathode metal.

15 Claims, 11 Drawing Sheets

(52) U.S. Cl.
CPC ....... *H01M 4/382* (2013.01); *H01M 10/0525* (2013.01); *H01M 2220/20* (2013.01); *H01M 2300/0068* (2013.01); *Y02E 60/122* (2013.01); *Y02T 10/7011* (2013.01)

(56) References Cited

U.S. PATENT DOCUMENTS

| | | |
|---|---|---|
| 5,919,587 A | 7/1999 | Mukherjee et al. |
| 7,252,907 B2 | 8/2007 | Takeuchi et al. |
| 8,182,943 B2 | 5/2012 | Visco et al. |
| 2012/0141881 A1 | 6/2012 | Geier et al. |
| 2012/0270088 A1 | 10/2012 | Huang et al. |
| 2013/0149590 A1 | 6/2013 | Wu et al. |
| 2014/0234715 A1* | 8/2014 | Fasching ............... H01M 4/04 429/220 |

OTHER PUBLICATIONS

Yonggang Wang, et al., "A new type rechargeable Lithium battery based on a Cu-cathode", Electrochemistry Communication 11 (2009) pp. 1834-1837.

Kazunori Takada, et al., "Solid-state lithium battery with graphite anode", Solid State Ionics 158 (2003) pp. 269-274.

* cited by examiner

ALL-SOLID-STATE METAL-METAL BATTERY COMPRISING ION CONDUCTING CERAMIC AS ELECTROLYTE

BACKGROUND

The application is directed to an all-solid-state battery. In particular, the application relates to an all-solid-state metal-metal battery comprising ion conducting ceramic solids as the electrolytes.

Rechargeable batteries become increasingly important in daily life. It is particularly desirable to have a rechargeable battery with both high energy density and high power density.

Lithium (Li)-ion battery is superior to nickel-metal hydride (Ni-MH) battery because Li-ion battery has higher energy density and power density. Conventional Li-ion batteries are based on the "rocking-chair" principle of simultaneous Li ion extraction and insertion in both anode and cathode. Li ions are transferred through electrolytes between the two electrodes during the charging/discharging processes, in concert with electron transport through the external circuit. Inside a Li-ion battery, therefore, Li ions are a single type of carriers to be released and to receive electrons. The power density of a Li-ion battery is related to the diffusion rate of Li ions in the electrolytes. The energy density, however, is related to the host-guest relationship. Therefore, the energy density of a Li-ion battery is controlled by the electrode host structure.

Since the commercialization of Li-ion batteries in the early 1990s, tremendous efforts have been devoted to improving the performance of Li-ion batteries. However, even the most advanced Li-ion battery is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. This energy density is close to the theoretical limit of a lithium ion active material.

In addition, batteries typically do not have both high energy density and high power density because usually there is a trade-off relationship between these two features. An ultimate rechargeable battery with both high enough energy density and high enough power density for automotive applications is yet to be developed. Much effort has been devoted to the development of such post Li-ion batteries.

One idea to obtain a battery with both high energy density and high power density is to go beyond the conventional "rocking-chair" principle.

For example, Li-air batteries use inexhaustible oxygen from outside (i.e. air) instead of storing an oxidizer inside. Therefore, a Li-air battery has much higher energy density when compared with a conventional Li-ion battery and have potential application in the field of long-range electric vehicles. However, unsolved fundamental problems such as poor oxygen redox kinetics at the positive electrode and deleterious volume and morphology changes at the negative electrode greatly limit the practical application of Li-air batteries. Therefore, Li-air batteries still remain as a research topic today.

Placke et al. described in *J. Electrochem. Soc.*, 159(11), pp. A1755-A1765 (2012) a "dual ion" cell, in which dual mobile ions from the electrolyte act as carriers inside the battery. That is, both cations and anions from the electrolyte take part in the charge/discharge reactions in the dual ion cell. Although the dual-ion systems described by Placke et al. have excellent charge/discharge cycling behavior, the maximum theoretical energy densities does not appear to be sufficient for automotive applications.

Takada et al. described in *Solid State Ionics*, 158, pp. 269-274 (2003) a solid-state Li battery using graphite as the anode, $LiCoO_2$ as the cathode, $LiI$—$Li_2S$—$P_2S_5$ glass as the anolyte, and $Li_3PO_4$—$Li_2S$—$SiS_2$ glass or $Li_2S$—$GeS_2$—$P_2S_5$ crystalline material as the catholyte. It should be noted that although two kinds of Li-ion conducting solid electrolytes are used in the battery, Li-ions are still the single type of carriers transported in both electrolytes. The energy density of such solid-state Li batteries is found comparable with the energy density of commercial Li-ion batteries.

Wang et al. described in *Electrochem. Commun.*, 11, pp. 1834-1837 (2009) a metal-metal battery, in which a Li-anode in a non-aqueous anolyte and a Cu-cathode in an aqueous catholyte are separated by LISICON, a Li superionic conductor glass film. In this metal-metal battery, the cathode reaction of Li insertion/extraction in conventional Li-ion batteries is replaced by Cu dissolution/deposition. Therefore, the Cu-cathode is renewable. It is noted that two different cations—Li cations and Cu cations—exist in this metal-metal battery. However, because the anolyte and the catholyte is separated by a glass film only permeable to Li ions, Cu ions only exist in the catholyte while Li ions exist in both the anolyte and the catholyte.

It is known that Li ions are mobile carrier solvated in a solution, whereas they diffuse alone in a conducting solid. Because the metal-metal battery described in Wang et al. contains both solutions and conducting solids, Li ions are transported from one electrode to the other through complicated steps, that is, desolvation on one electrode, solvation in one electrolyte, desolvaton on the LISICON film, solvation in the other electrolyte, and desolvation on the other electrode. This would cause interfacial resistance changes with changing state of charge/discharge so that the overall battery resistance and performance would be adversely affected.

An all-solid-state battery has potential in mitigating or hindering such a complicated solvation-desolvation process. In addition, metals generally have higher theoretical capacity than traditional intercalation materials and the metal dissolution/deposition mechanism is more promising than the conventional "rocking chair" principle to achieve higher energy density of the battery. Recognizing all these potentials of all-solid-state metal-metal batteries, inventors of the present invention are directing effort and resources to the study of such batteries in order to obtain a next generation solid-state metal-metal battery with both high energy density and high power density.

Accordingly, an object of the present invention is to provide an all-solid-state metal-metal battery of higher energy density and higher power density than the conventional Li-ion batteries. Another object is to provide an all-solid-state metal-metal battery with simple structures. These and other objects, features, and advantages of the present invention will become more evident from the following discussion as well as the drawings.

SUMMARY

In one embodiment of the present invention, an all-solid-state metal-metal battery comprises, in the following order, an anode comprising an alkali metal or an alkaline earth metal as an active anode metal, an anolyte comprising an active anode metal ion conducting ceramic solid, a catholyte comprising an active cathode metal ion conducting ceramic solid, and a cathode comprising a transition metal as an active cathode metal.

In another embodiment, an all-solid-state metal-metal battery comprises an anode current collector devoid of the active anode metal prior to the initial charge and a cathode comprising the active cathode metal, separated by an anolyte comprising an active anode metal ion conducting ceramic solid and a catholyte comprising an active cathode metal ion conducting ceramic solid.

In another embodiment, an all-solid-state metal-metal battery comprises an anode comprising the active anode metal and a cathode current collector devoid of the active cathode metal prior to the initial charge, separated by an anolyte comprising an active anode metal ion conducting ceramic solid and a catholyte comprising an active cathode metal ion conducting ceramic solid.

In another embodiment, the active anode metal is an alkali metal, preferably, lithium or sodium.

In another embodiment, the active anode metal is an alkaline earth metal, preferably, magnesium.

In another embodiment, the active cathode metal is a transition metal, preferably, silver or copper.

In another embodiment, the anode is a composite metallic electrode, which comprises an active anode metal and an active anode metal ion conducting ceramic solid electrolyte.

In another embodiment, the cathode is a composite metallic electrode, which comprises an active cathode metal and an active cathode metal ion conducting ceramic solid electrolyte.

In another embodiment, the anolyte and/or the catholyte is amorphous.

In yet another embodiment, the anolyte and/or the catholyte is a composite, which further comprises a non-ion conducting binder.

The foregoing paragraphs have been provided by way of general introduction, and are not intended to limit the scope of the following claims. A more complete appreciation of the disclosure and many of the attendant advantages thereof will be readily obtained as the same becomes better understood by reference to the following detailed description when considered in connection with the accompanying drawings.

DETAILED DESCRIPTION

Figure 1:
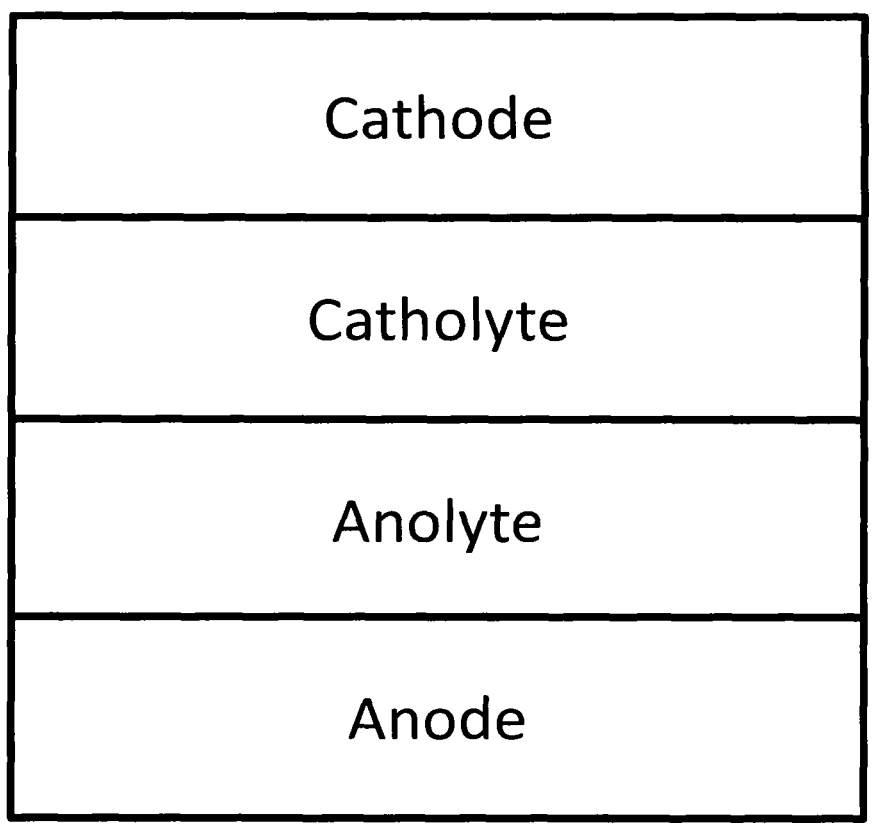
FIG. 1 shows a schematic structure of an all-solid-state metal-metal battery according to one embodiment of the present invention (substrates for electrodes not shown).

Throughout this description, the terms "electrochemical cell" and "battery" may be employed interchangeably unless the context of the description clearly distinguishes an electrochemical cell from a battery.

Inventors of the present invention have conducted a wide scale study and evaluation of materials and methods suitable for the production of a battery with both high power density and high energy density which may ultimately serve as a power source for an electric vehicle. The Inventors have surprisingly discovered that the invented all-solid-state metal-metal batteries have higher charge/discharge rate capability and higher power density than classical batteries and have the potential to overcome the typical trade-off relationship between power density and energy density.

The invented all-solid-state metal-metal batteries contain two mobile carriers (i.e., an active anode metal ion and an active cathode metal ion), at least one active anode metal ion conducting ceramic solid as the anolyte, and at least one active cathode metal ion conducting ceramic solid as the catholyte. During the operation of the battery, one mobile carrier is switched to the other to fulfill the redox reaction at the anode/electrolyte and cathode/electrolyte interface independently.

Although not wishing to be limited by theory, the Inventors believe that the outstanding performance of the invented all-solid-state metal-metal batteries may be explained by, among other things, the high mobility of the mobile carrier in a conducting solid, the high capacity of a metal electrode, and the metal dissolution/deposition mechanism instead of the conventional "rocking chair" principal. The transference number of a mobile carrier in a conducting solid is almost unity so that the complicated solvation-desolvation process such as the one occurred in the battery described in Wang et al. typically would not have effect on the transport of the mobile carrier in the conducting solid. In addition, ion conducting solids have high ionic conductivity and negligible electronic conductivity and ion diffusion inside the conducting solid is much faster than that in intercalation compounds. Because metals generally have higher theoretical capacity than traditional intercalation materials, a battery using metal electrodes potentially has higher energy density than a battery using electrodes made of intercalation materials. Furthermore, metal deposition and dissolution is fast even on a solid and the metal dissolution/deposition mechanism is more promising than the conventional "rocking chair" principle to achieve higher energy density of the battery. As such, the invented all-solid-state metal-metal batteries have the potential to overcome the typical trade-off relationship between power density and energy density so that they possess both high power density and high energy density.

The embodiments of the present invention, as disclosed herein, offer optimal structures for the invented all-solid-state metal-metal batteries.

As schematically shown in FIG. 1, one embodiment of the invented electrochemical cell has an anode comprising an active anode metal and a cathode comprising an active cathode metal, separated by an anolyte layer comprising an active anode metal ion conducting ceramic solid and a catholyte layer comprising an active cathode metal ion conducting ceramic solid.

The metallic active anode and the metallic active cathode do not need to include any additional conductive materials or binder. The metallic active electrodes can also act as current collectors. In addition, because solid electrolytes are used, separators may be omitted. Therefore, the present invention provides a high-performance battery with a simple structure.

Optionally, the all-solid-state metal-metal battery of the present invention may include separators and/or current collectors.

A separator helps maintain electrical isolation between the cathode and the anode. A separator may include fibers, particles, web, porous sheets, or other forms of material configured to reduce the risk of physical contact and/or short circuit between the electrodes. The separator may be a unitary element, or may include a plurality of discrete spacer elements such as particles or fibers.

The current collector may include a metal or other electrically conducting sheet on which the electrode is supported. The current collector may be formed of carbon, carbon paper, carbon cloth or a metal or noble metal mesh or foil. Preferred current collectors may be carbon, stainless steel, and nickel. In certain embodiments, the current collector may comprise a protective coating of an oxidation-resistant metal or alloy to protect the collector from oxidation.

Figure 2:
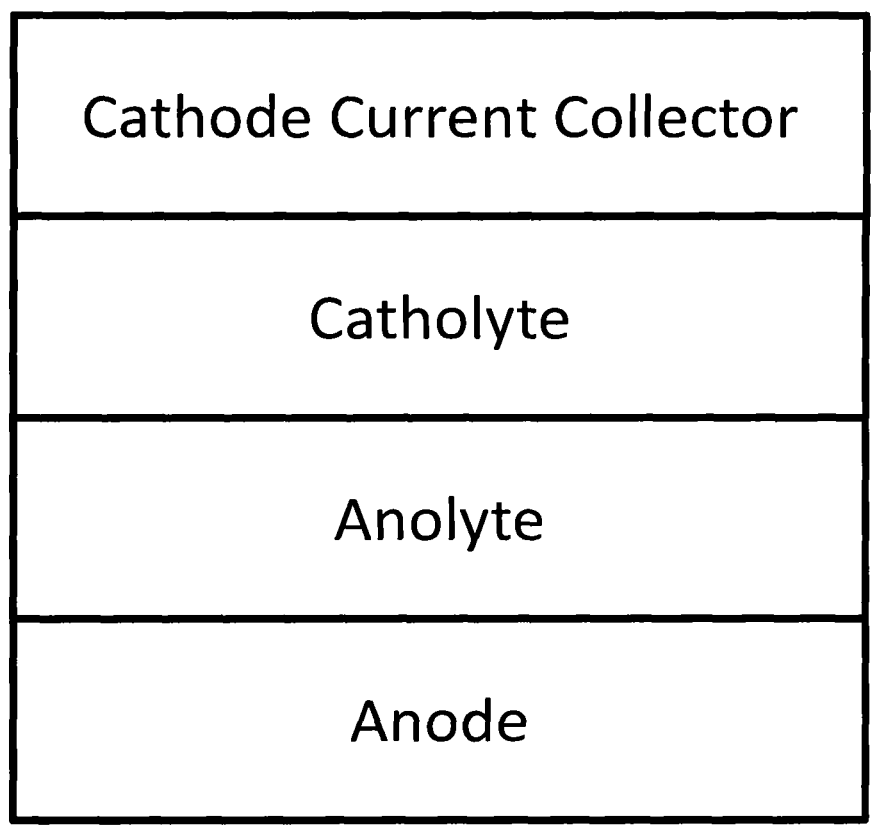
FIG. 2 shows a schematic structure of an all-solid-state metal-metal battery according to another embodiment of the present invention prior to the initial charge (substrate for anode not shown).
Figure 3:
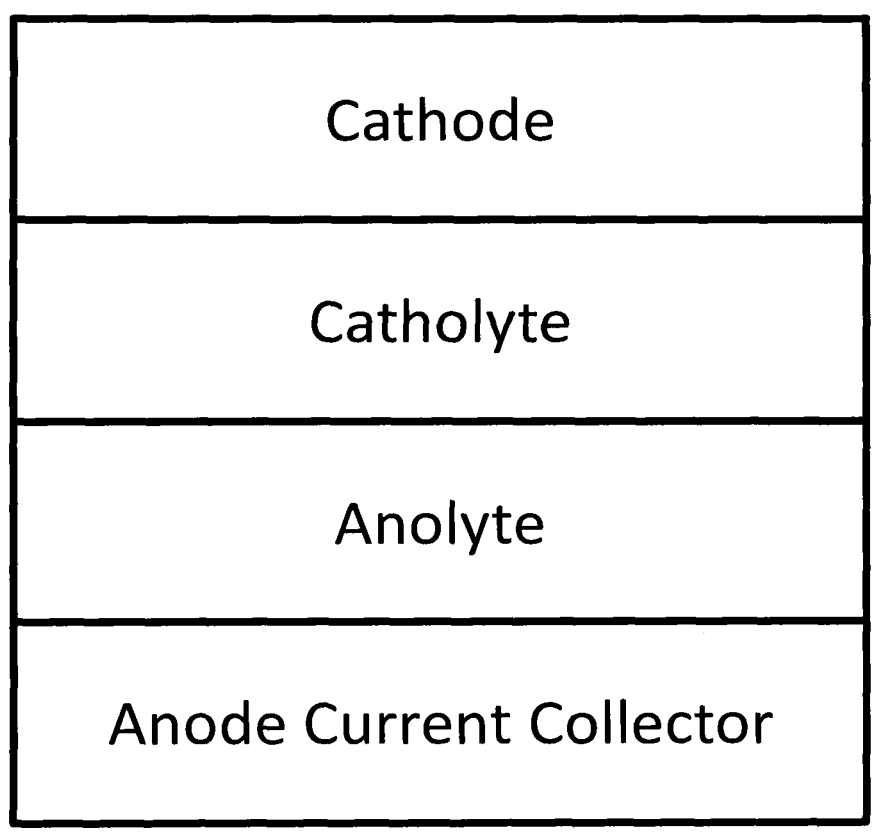
FIG. 3 shows a schematic structure of an all-solid-state metal-metal battery according to a further embodiment of the present invention prior to the initial charge (substrate for cathode not shown).

FIG. 2 and FIG. 3 respectively show a schematic structure of an electrochemical cell according to other embodiments of the present invention prior to the initial charge.

FIG. 2 shows a cell with an anolyte layer comprising an active anode metal ion conducting ceramic solid and a catholyte layer comprising an active cathode metal ion conducting ceramic solid sandwiched between an anode comprising an active anode metal and a cathode current collector devoid of the active cathode metal prior to the initial charge. After the initial charge, the active cathode metal deposits on the cathode current collector and an active metallic cathode is then created. As a result, a metal-metal battery with a structure similar to the one shown in FIG. 1 can be obtained.

Suitable cathode current collector may be formed of carbon, carbon paper, carbon cloth or a metal or noble metal mesh or foil. Preferred cathode current collectors may be carbon, stainless steel and nickel.

FIG. 3 shows a cell with an anolyte layer comprising an active anode metal ion conducting ceramic solid and a catholyte layer comprising an active cathode metal ion conducting ceramic solid sandwiched between an anode current collector devoid of the active anode metal prior to the initial charge and a cathode comprising an active cathode metal. Similar to the cell shown in FIG. 2, after the initial charge, the active anode metal deposits on the anode current collector and an active metallic anode is then created. As a result, a metal-metal battery with a structure similar to the one shown in FIG. 1 can also be obtained.

Suitable anode current collector may be formed of carbon, carbon paper, carbon cloth or a metal or noble metal mesh or foil. Preferred anode current collectors may be carbon, stainless steel and nickel.

The active anode metal is preferably an alkali metal or an alkaline earth metal. The alkali metal is preferably lithium or sodium, and more preferably, lithium. The alkaline earth metal is preferably magnesium. In some embodiments, the anode may be a composite metallic electrode comprising an active anode metal and an active anode metal ion conducting ceramic solid electrolyte, which may or may not be the same as the anolyte.

The active cathode metal is preferably a transition metal, and more preferably, silver or copper. In some embodiments, the cathode may be a composite metallic electrode comprising an active cathode metal and an active cathode metal ion conducting ceramic solid electrolyte, which may or may not be the same as the catholyte.

The anolyte comprises an active anode metal ion conducting ceramic. The anolyte may be crystalline or amorphous. The anolyte may be a solid composite of an active anode metal ion conducting ceramic, a non-ion conducting binder, and/or polymer electrolyte. Suitable ceramic active anode metal ion conductors include glassy or amorphous metal ion conductors as typified by oxide-based glasses, sulfide-based glasses, nitride-based glasses, phosphide-based glasses, selenide-based glasses, and the like, and crystalline metal ion conductors as classified by beta-alumina, LISICON (lithium superionic conductor), thio-LISICON, NASICON (sodium superionic conductor), perovskite, garnet, borohydride, nitride, iodide, and the like. In the preferred embodiments, the anolyte is a lithium ion conducting ceramic, such as $Li_3PO_4$—$Li_3BO_3$ glass, $LiNbO_3$ glass, $Li_3PS_4$ glass, $Li_2S$—$P_2S_5$—$Li_4SiO_4$ glass, $LiI$—$Li_2S$—$P_2S_5$ glass, $Li_xPO_yN_z$ (LIPON) glass, $Li_7La_3Zr_2O_{12}$ crystal, $Li_{0.33}La_{0.56}TiO_3$ crystal, $Li_{1.3}Al_{0.3}Ti_{1.7}(PO_4)_3$ crystal, $Li_{1.6}Al_{0.6}Ge_{1.4}(PO_4)_3$ crystal, $Li_7P_3S_{11}$ crystal, $Li_{3.25}P_{0.25}Ge_{0.75}S_4$ crystal, $Li_{10}GeP_2S_{12}$ crystal, $LiBH_4$ crystal, and $Li_3N$ crystal, to be used with an anode comprising lithium; a sodium ion conducting ceramic, such as beta-$Al_2O_3$, $Na_3PS_4$ glass, $Na_3Zr_2Si_2PO_{12}$ crystal, and $Na_2B_{10}H_{10}$ crystal, to be used with an anode comprising sodium; or a magnesium ion conducting ceramic such as $MgBH_4$—$MgNH_2$ crystal to be used with an anode comprising magnesium.

The catholyte comprises an active cathode metal ion conducting ceramic. The catholyte may be crystalline or amorphous. The catholyte may be a solid composite of an active cathode metal ion conducting ceramic, a non-ion conducting binder, and/or polymer electrolyte. Suitable ceramic active cathode metal ion conductors include glassy or amorphous metal ion conductors as typified by oxide-based glasses, sulfide-based glasses, nitride-based glasses, phosphide-based glasses, selenide-based glasses, and the like, and crystalline metal ion conductors as typified by iodide and sulfide. In the preferred embodiments, the catholyte is a silver ion conducting ceramic, such as the $Ag_7P_3S_{11}$ glass and crystal, $AgI$—$Ag_2O$—$P_2O_5$ glass, $AgI$ crystal, and $RbAg_4I_5$ crystal, to be used with a cathode comprising silver; or a copper ion conducting ceramic, such as $CuI$—$Cu_2O$—$P_2O_5$ glass, $CuI$ crystal, and $RbCu_4I_5$ crystal, to be used with a cathode comprising copper.

Figure 4:
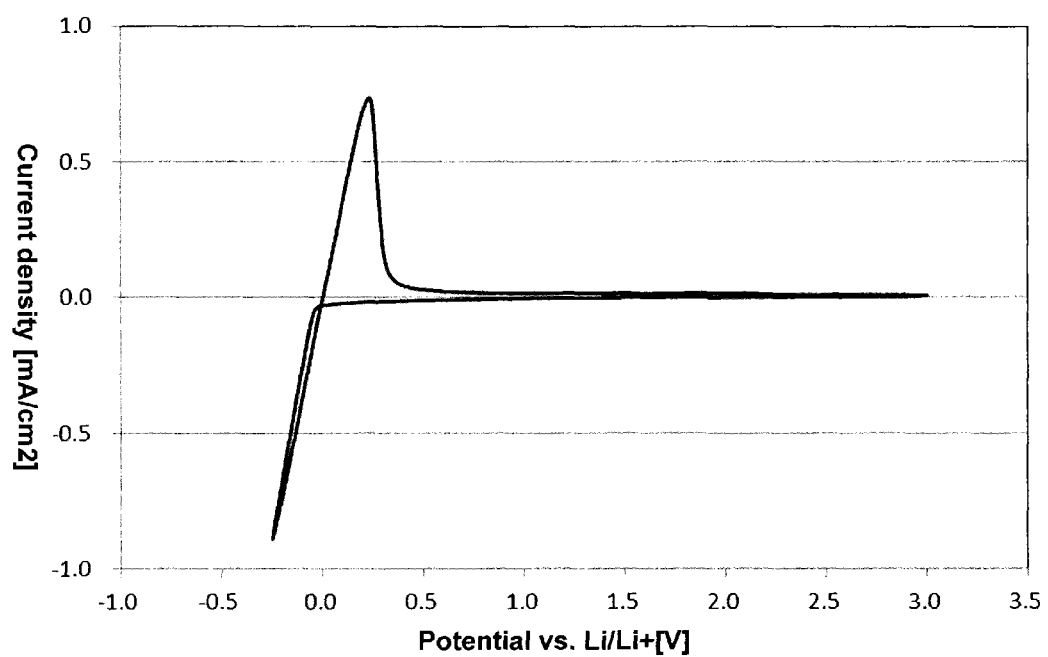
FIG. 4 shows the cyclic voltammogram of $Li_3PS_4$ (LPS) glass at a scan rate of 5 mV/sec.
Figure 5:
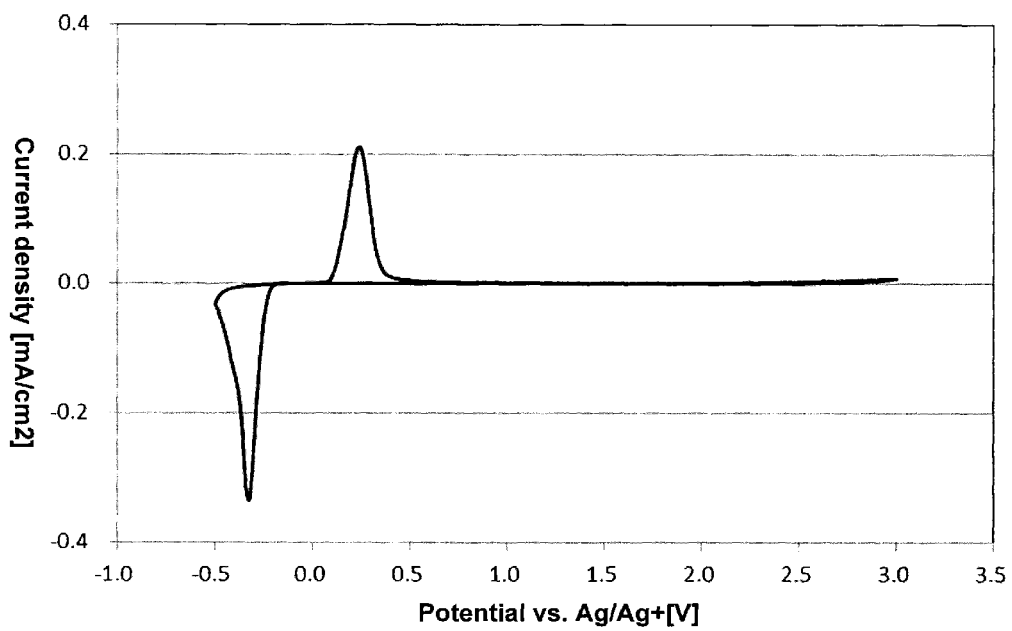
FIG. 5 shows the cyclic voltammogram of $Ag_7P_3S_{11}$ (APS) glass at a scan rate of 5 mV/sec.

A cyclic voltammogram of $Li_3PS_4$ (LPS) glass and a cyclic voltammogram of $Ag_7P_3S_{11}$ (APS) glass are shown in FIG. 4 and FIG. 5, respectively. It is clear from these figures that both the LPS glass and the APS glass have a reversible pair of metal deposition and dissolution coupled with high anodic stability, which are ready to use for an all-solid-state metal-metal battery.

In the preferred embodiments, Li, Na and/or Mg are selected as the anode metal and Li ion, Na ion and/or Mg ion conducting solid electrolytes are selected as the anolyte.

In some other preferred embodiment, Ag and/or Cu are selected as the cathode metal and Ag ion and/or Cu ion conducting solid electrolytes are selected as the catholyte.

Embodiments of the present invention are illustrated in more detail by virtue of examples described below. However, it is to be understood that these examples are merely exemplary and only serve to illustrate the preferred embodiments of the present invention. These examples should not be construed as limiting the scope of the present invention.

EXAMPLES

Example 1

$Li_3PS_4$ (LPS) glass was selected as the material for the Li-ion conducting ceramic anolyte. $Ag_7P_3S_{11}$ (APS) glass was selected as the material for the Ag-ion conducting ceramic catholyte. Both the LPS glass and the APS glass were prepared by first mechanical milling of the starting materials under 370 rpm for 20 h using $ZrO_2$ pot and balls. The anolyte and catholyte were then pressed to fabricate a biphase pellet.

Next, an Ag powder for cathode was pressed on the top of the Ag-ion conducting catholyte and a Li foil anode was attached on the top of the Li-ion conducting anolyte.

The resultant all-solid-state Li/LPS/APS/Ag cell thus had a structure as schematically illustrated in FIG. 1.

Figure 6:
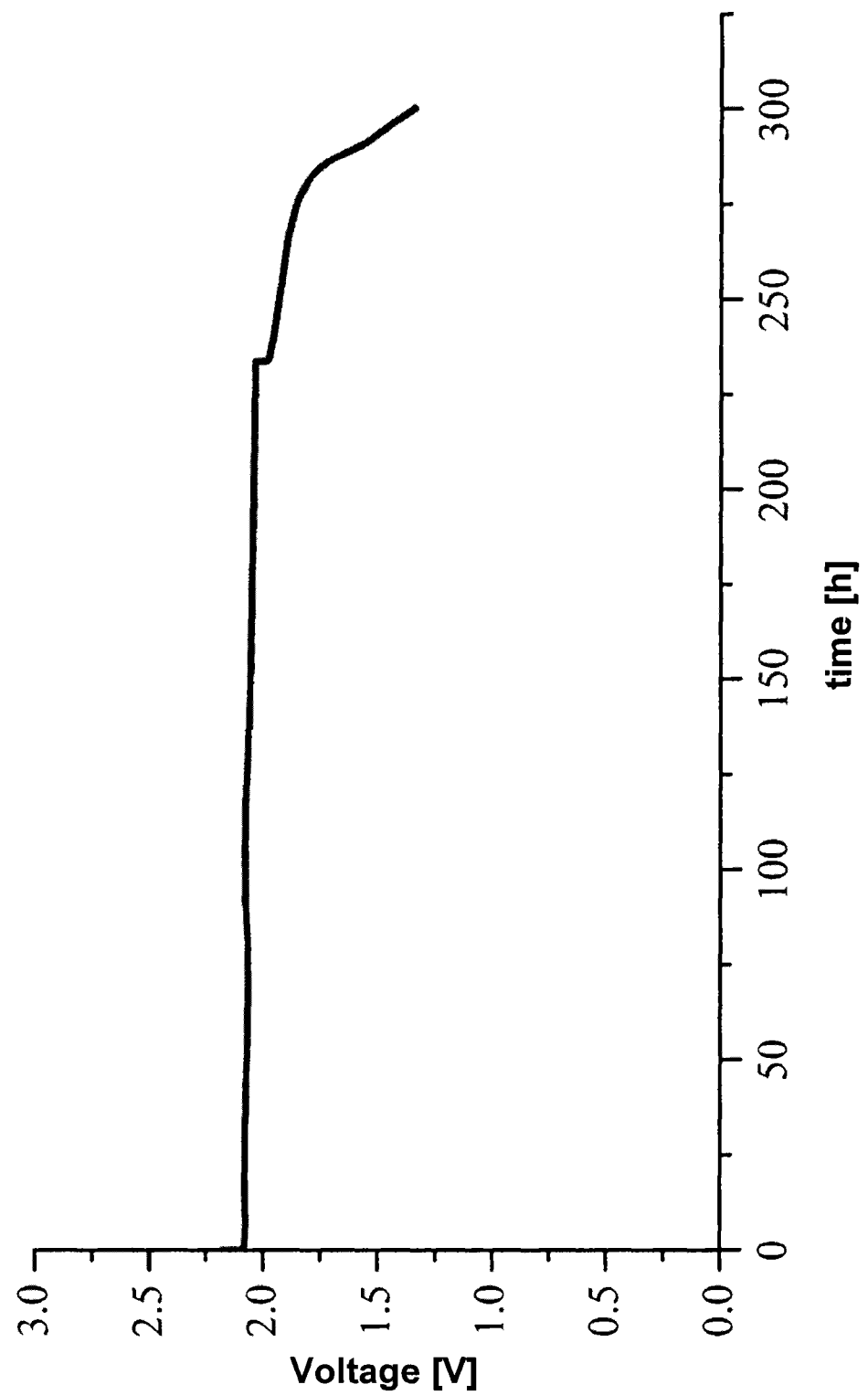
FIG. 6 shows the initial discharge profile of a "Li/LPS/APS/Ag" cell at an initial current density of 0.032 mA/cm$^2$ and a subsequent current density of 0.13 mA/cm$^2$ at 25° C.

FIG. 6 shows the initial discharge profile of the obtained Li/LPS/APS/Ag cell at 25° C. The current density was initially 0.032 mA/cm² and then changed into 0.13 mA/cm². As shown in FIG. 6, the cell operated at 2.0 V for at least 300 hours.

Figure 7:
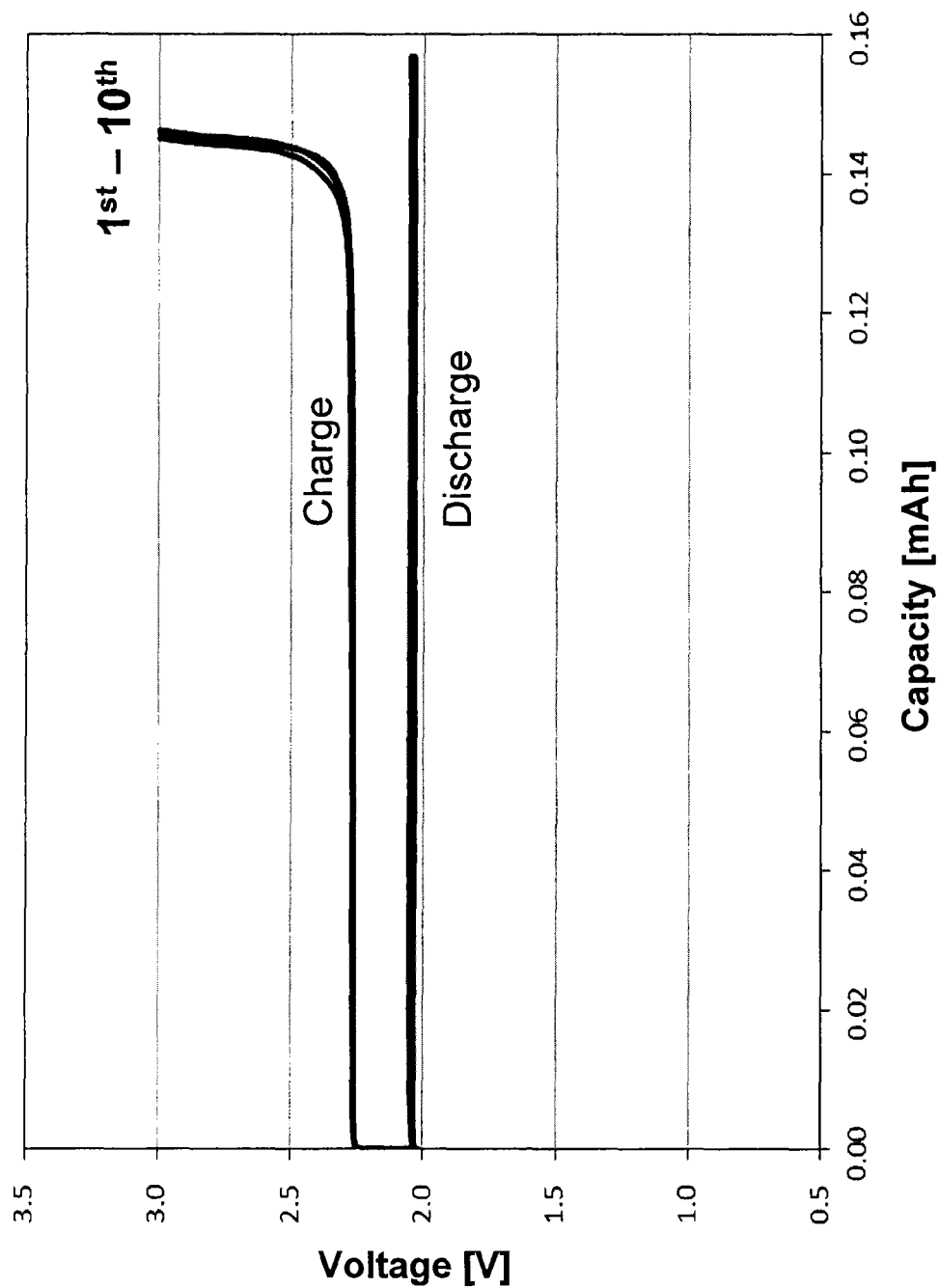
FIG. 7 shows the charge/discharge profiles of the first ten cycles of a "Li/LPS/APS/Ag" cell at a current density of 0.1 mA/cm$^2$ at 25° C.

FIG. 7 shows the charge/discharge profiles of the first ten cycles of the Li/LPS/APS/Ag cell at a current density of 0.1 mA/cm² at 25° C. The cut-off condition for the discharge was 0.16 mAh (2 mAh/g-catholyte) and the cut-off voltage for the charge was 3.0 V. As shown in this figure, the obtained Li/LPS/APS/Ag cell operated very well for ten cycles at around 2.1 V and the irreversible capacity was only 6%.

Figure 8:
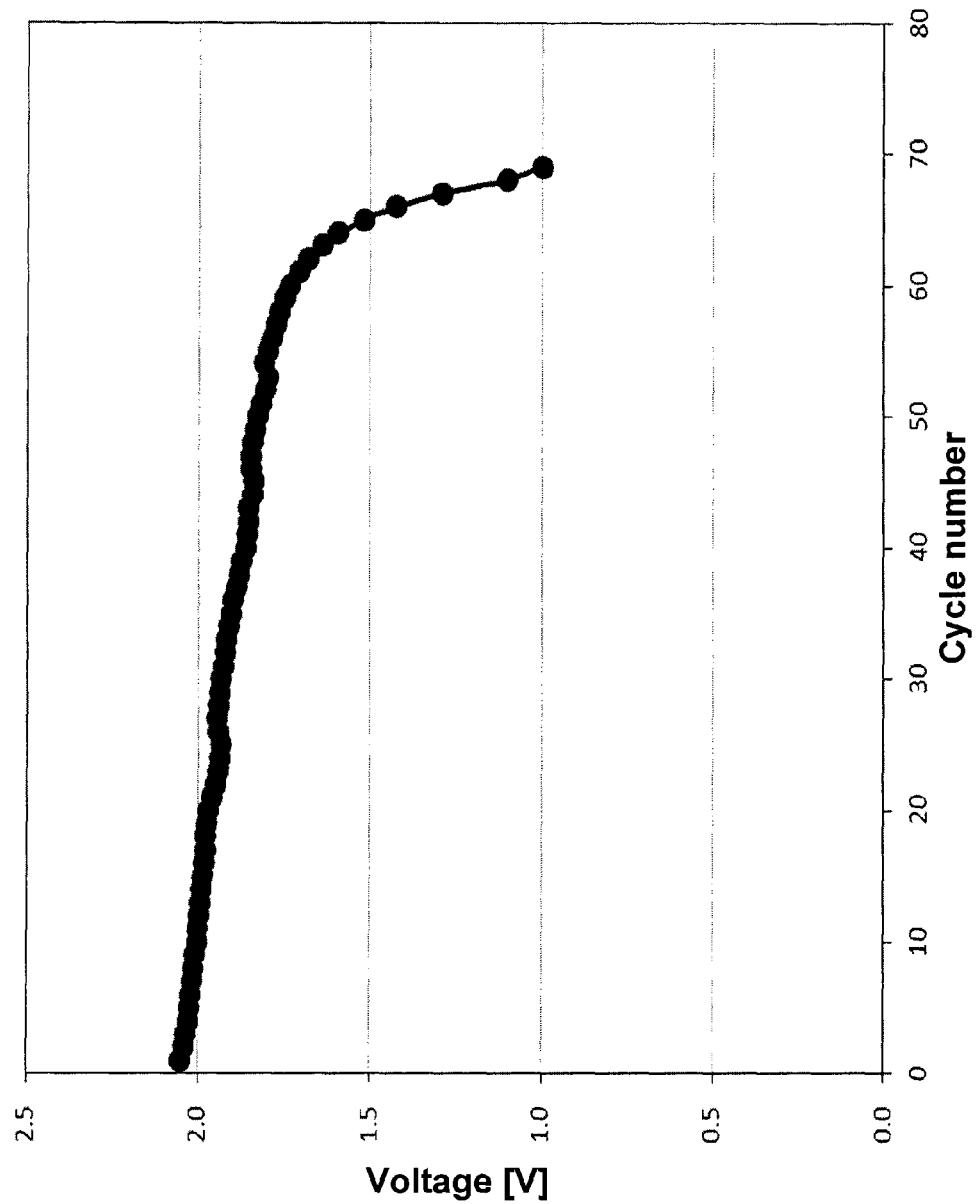
FIG. 8 shows the long-term stability of the discharge voltage of the Li/LPS/APS/Ag cell as a function of cycle number at a current density of 0.1 mA/cm$^2$ at 25° C.

FIG. 8 shows the long-term stability of the discharge voltage of the Li/LPS/APS/Ag cell as a function of cycle number at 25° C. The current density was 0.1 mA/cm². The cut-off conditions for the discharge and charge were the same as those in FIG. 7. As shown in this figure, the cell satisfactorily operated for seventy cycles before the cell voltage decreased to 1 V.

Figure 9:
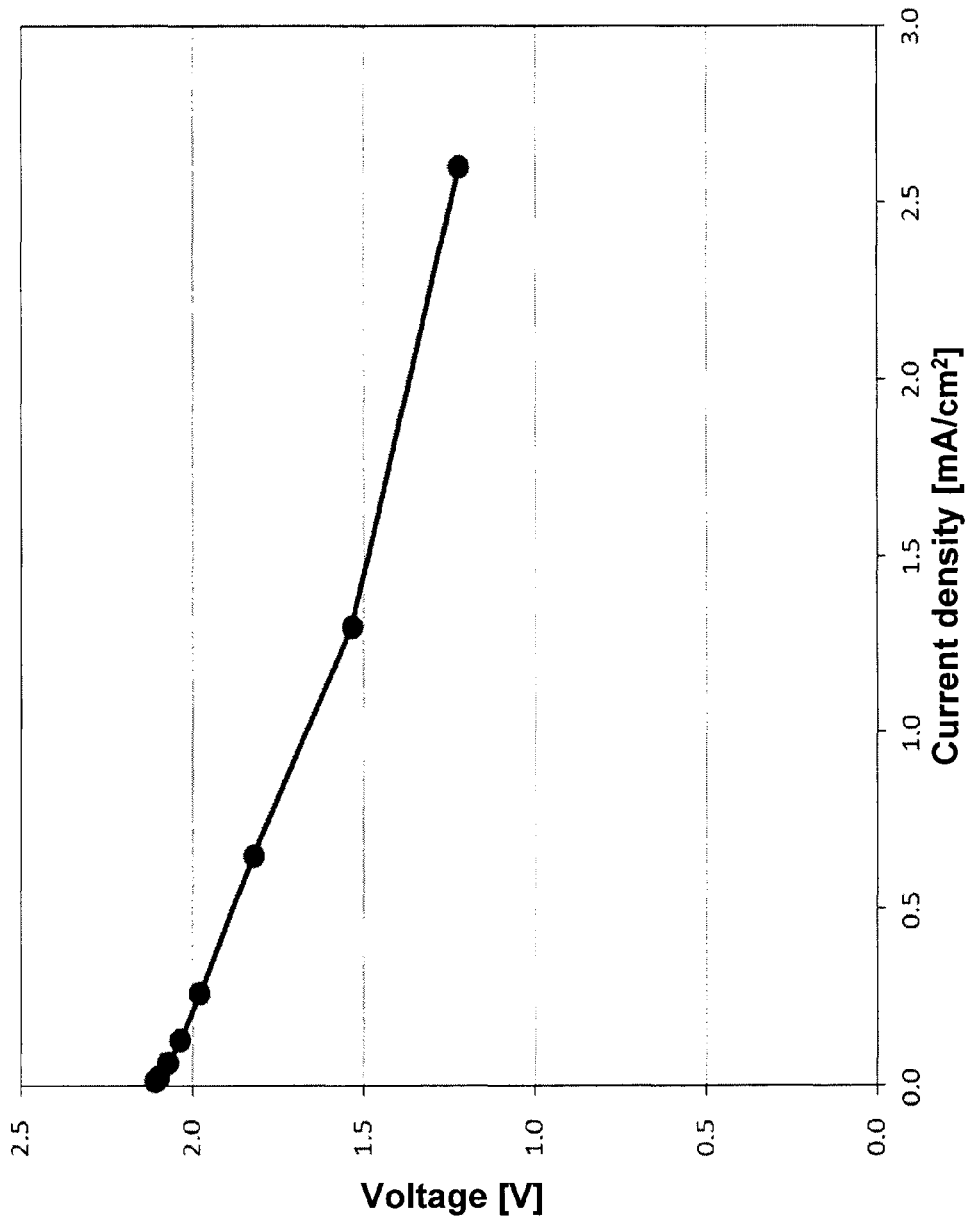
FIG. 9 shows the discharge I-V test result of the Li/LPS/APS/Ag cell as a function of current densities at 25° C.

FIG. 9 shows the discharge I-V test result of the Li/LPS/APS/Ag cell as a function of current densities at 25° C. The current densities were changed every 10 minutes in the range of from 0.013 mA/cm² to 2.6 mA/cm². As can be seen, the cell was able to operate at higher current densities.

Example 2

$Li_7P_3S_{11}$ (LPS2) glass was selected as the material for the Li-ion conducting ceramic anolyte and the APS glass was selected as the material for the Ag-ion conducting ceramic catholyte. Both the LPS2 glass and the APS glass were prepared and the anolyte and catholyte were then pressed to fabricate a biphase pellet in the same way as that described in Example 1.

A Li foil anode was attached on the top of the Li-ion conducting anolyte. A stainless steel as the cathode current collector was attached to the Ag-ion conducting ceramic catholyte.

Therefore, before the initial charge, the cell could be referred to as a "Li/LPS2/APS/cathode current collector" and had a structure as that schematically shown in FIG. 2.

Figure 10:
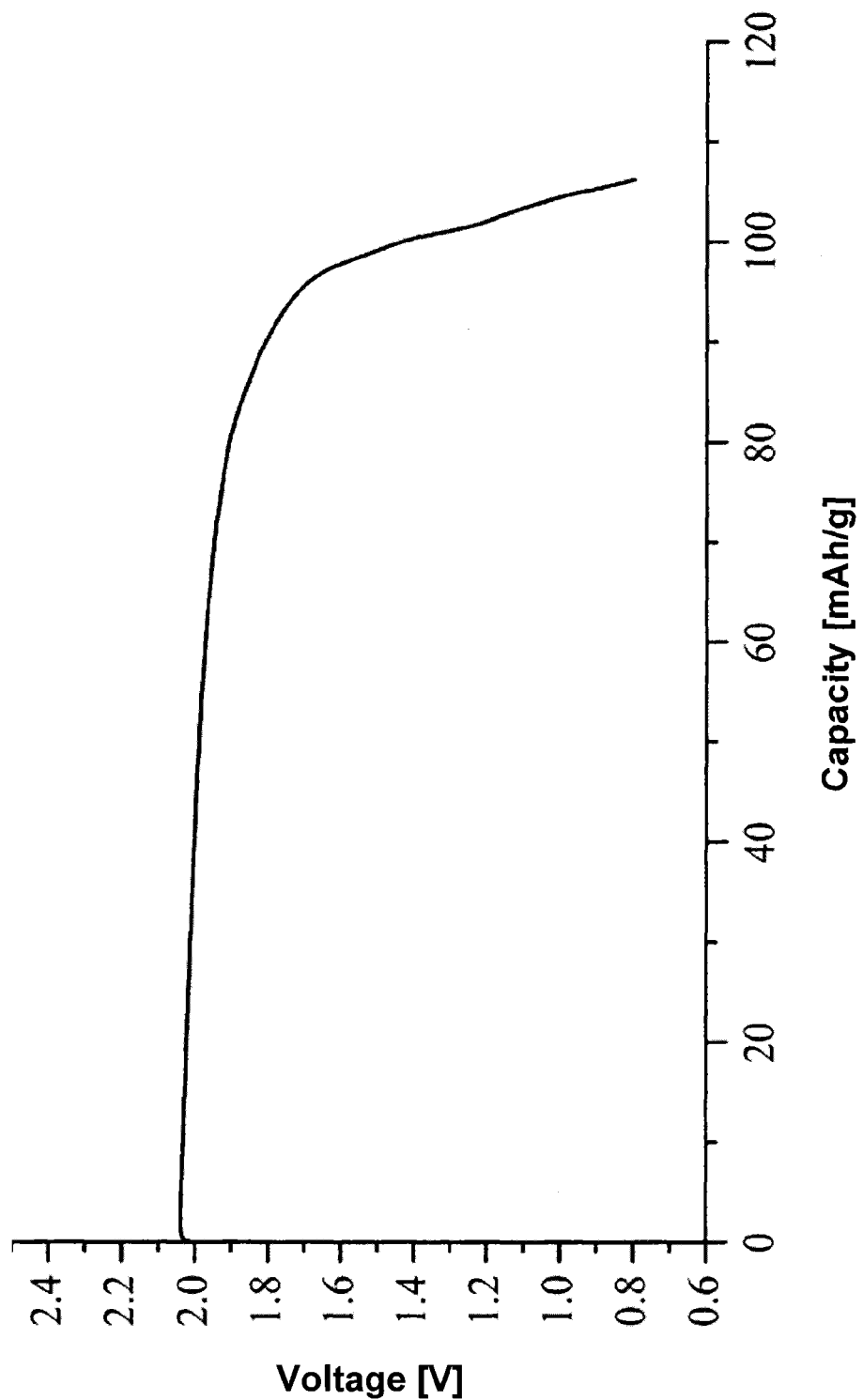
FIG. 10 shows the initial discharge profile of a "Li/LPS2/APS/cathode current collector" cell at a current density of 0.127 mA/cm$^2$ at 25° C.

FIG. 10 shows the initial discharge profile of the Li/LPS2/APS/cathode current collector cell at a current density of 0.127 mA/cm² at 25° C. It can be seen from the figure that at the end of the discharge, 70% of theoretical capacity of APS was collected with a flat plateau at 2 V.

A proposed reaction of the Li/LPS2/APS/cathode current collector cell during the discharge can be schematically shown as follows:

Anode reaction: $xLi \rightarrow xLi^+ + xe^-$

Anolyte reaction: $Li_7P_3S_{11} + xLi^+ \rightarrow Li_7P_3S_{11} + xLi^+$

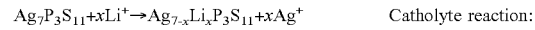
Catholyte reaction: $Ag_7P_3S_{11} + xLi^+ \rightarrow Ag_{7-x}Li_xP_3S_{11} + xAg^+$

Cathode reaction: $xAg^+ + xe^- \rightarrow xAg$.

Assuming the above-described catholyte reaction is from monoclinic APS to monoclinic LPS2, the theoretical voltage was estimated to be 1.996 V, which was in excellent agreement with the experimental result as shown in FIG. 10.

Figure 11:
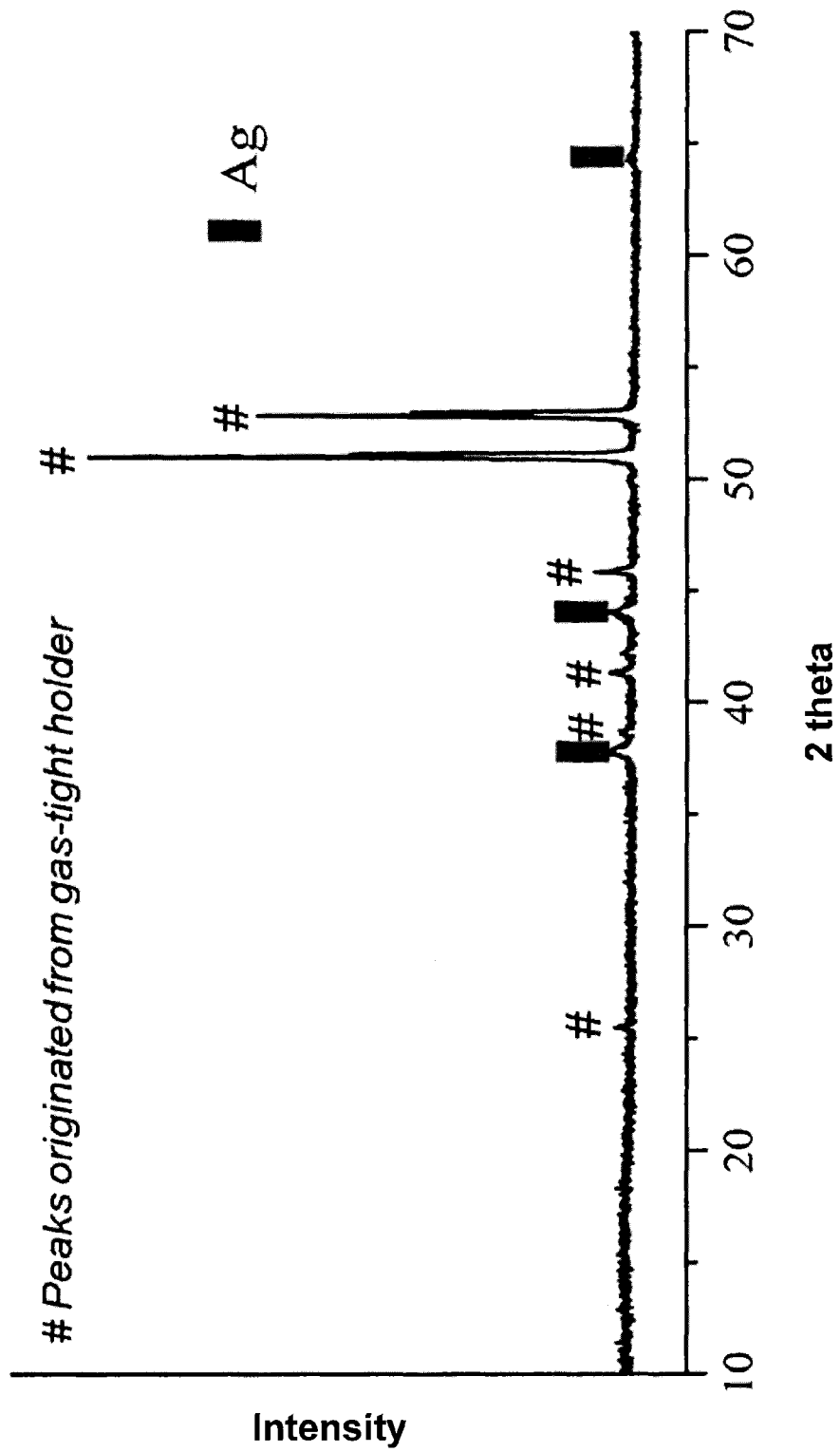
FIG. 11 shows the XRD spectrum of the APS catholyte for a "Li/LPS2/APS/cathode current collector" cell at the end of the initial discharge at a current density 0.127 mA/cm$^2$ at 25° C.

The fact that Ag was deposited on the cathode current collector was further confirmed by the XRD spectrum of the APS catholyte, as shown in FIG. 11.

Comparative Example 1

$Li_3PS_4$ (LPS) glass was selected as the solid electrolyte. The LPS glass was prepared by first mechanical milling of the starting material under 370 rpm for 20 h using $ZrO_2$ pot and balls and then pressed to fabricate a pellet. An Ag powder for cathode was then pressed on one side of the LPS glass and a Li foil anode was attached on the other side of the LPS glass to obtain a "Li/LPS/Ag" cell.

The open circuit voltage (OCV) for the Li/LPS/Ag cell was 2.15 V and there was no charge/discharge plateaus observed at 2 V. The results were summarized in Table 1.

Comparative Example 2

$Ag_7P_3S_{11}$ (APS) glass was selected as the solid electrolyte. The APS glass was prepared by first mechanical milling of the starting materials under 370 rpm for 20 h using $ZrO_2$ pot and balls and then pressed to fabricate a pellet. An Ag powder for cathode was then pressed on one side of the APS glass and a Li foil anode was attached on the other side of the APS glass to obtain a "Li/APS/Ag" cell.

The OCV for the Li/APS/Ag cell was only 0.10 V and there was no charge/discharge plateaus observed at 2 V. The results were also summarized in Table 1.

Table 1 compares the performance of the cells of Examples 1 and 2 and Comparative Examples 1 and 2. As shown in Table 1, in order to obtain an operable all-solid-state metal-metal cell, the cell needs to have dual ion conducting solid electrolyte layers.

TABLE 1

|  | Cell configuration | OCV (V) | Possibility of D/C cycle at 2 V |
|---|---|---|---|
| Ex. 1 | Li/LPS/APS/Ag | 2.23 | Yes |
| Ex. 2 | Li/LPS/APS/cathode current collector | 2.25 | Yes |
| Com. Ex. 1 | Li/LPS/Ag | 2.15 | No |
| Com. Ex. 2 | Li/APS/Ag | 0.10 | No |

While specific embodiments of the present invention have been described in detail, it will be appreciated by those skilled in the art that various modifications and alternatives to those details could be developed in light of the overall teachings of the disclosure. Accordingly, the particular embodiments disclosed are meant to be illustrative only and not limiting of the scope of the present invention, which is to be given the full breadth of the appended claims and any and all equivalents thereof.

The invention claimed is:

1. An all-solid-state metal-metal battery, comprising:
in the following order,
a metal anode comprising a metallic alkali metal or a metallic alkaline earth metal as an active anode metal;
an anolyte comprising an active anode metal ion conducting ceramic solid;
a catholyte comprising an active cathode transition metal ion conducting ceramic solid; and
a metal cathode comprising the metallic element of the active cathode transition metal ion as active cathode metal.

2. The all-solid-state metal-metal battery of claim 1, wherein the active anode metal is lithium, sodium, or magnesium.

3. The all-solid-state metal-metal battery of claim 2, wherein the active anode metal is lithium.

4. The all-solid-state metal-metal battery of claim 3, wherein the anolyte is a lithium phosphorous sulfide.

5. The all-solid-state metal-metal battery of claim 1, wherein the active cathode metal is silver or copper.

6. The all-solid-state metal-metal battery of claim 5, wherein the active cathode metal is silver.

7. The all-solid-state metal-metal battery of claim 6, wherein the catholyte is a silver phosphorous sulfide.

8. The all-solid-state metal-metal battery of claim 1, wherein the anode is a composite metallic electrode, which further comprises an active anode metal ion conducting ceramic solid electrolyte.

9. The all-solid-state metal-metal battery of claim 1, wherein the cathode is a composite metallic electrode, which further comprises an active cathode metal ion conducting ceramic solid electrolyte.

10. The all-solid-state metal-metal battery of claim 1, wherein the anolyte is amorphous.

11. The all-solid-state metal-metal battery of claim 1, wherein the anolyte is a composite, which further comprises a non-ion conducting binder.

12. The all-solid-state metal-metal battery of claim 1, wherein the catholyte is amorphous.

13. The all-solid-state metal-metal battery of claim 1, wherein the catholyte is a composite, which further comprises a non-ion conducting binder.

14. An all-solid-state metal-metal battery, comprising:
in the following order,
an anode current collector devoid of an active anode metal prior to a first charge;
an anolyte comprising an active anode metal ion conducting ceramic solid;
a catholyte comprising an active cathode transition metal ion conducting ceramic solid; and
a metallic cathode comprising the metallic transition metal as active cathode metal;
wherein the active anode metal ion is an alkali metal ion or alkaline earth metal ion.

15. An all-solid-state metal-metal battery, comprising:
in the following order,
an anode comprising an alkali metal or an alkaline earth metal as an active anode metal;
an anolyte comprising an active anode metal ion conducting ceramic solid;
a catholyte comprising an active cathode metal ion conducting ceramic solid; and
a cathode current collector devoid of an active cathode metal prior to a first charge
wherein the anolyte comprises an alkali metal ion or an alkaline earth metal ion corresponding to the active anode metal, and
the catholyte comprises a transition metal ion.

* * * * *